(12) United States Patent
Qiu et al.

(10) Patent No.: US 12,251,997 B2
(45) Date of Patent: Mar. 18, 2025

(54) FULLY-EMBEDDED SOFT FOUR-FOLD BED COVER FOR A PICKUP TRUCK

(71) Applicant: ZHEJIANG SURPASS AUTO PARTS CO., LTD., Zhejiang (CN)

(72) Inventors: Lei Qiu, Zhejiang (CN); Yi Lin, Zhejiang (CN); Lei Lin, Zhejiang (CN)

( * ) Notice: Subject to any disclaimer, the term of this patent is extended or adjusted under 35 U.S.C. 154(b) by 282 days.

(21) Appl. No.: 17/950,269

(22) Filed: Sep. 22, 2022

(65) Prior Publication Data

US 2024/0100921 A1 Mar. 28, 2024

(51) Int. Cl.
*B60J 7/14* (2006.01)
*F16C 11/04* (2006.01)

(52) U.S. Cl.
CPC .............. *B60J 7/141* (2013.01); *F16C 11/04* (2013.01)

(58) Field of Classification Search
CPC ....... B60J 7/14; B60J 7/141; B60J 7/16; B60J 7/1607; F16C 11/04
USPC ............. 296/100.06, 100.08, 100.09, 100.17
See application file for complete search history.

(56) References Cited

U.S. PATENT DOCUMENTS

| | | | |
|---|---|---|---|
| 8,690,224 B2 † | 4/2014 | Maimin | |
| 11,059,359 B2 * | 7/2021 | Dylewski | B60J 7/141 |
| 11,235,650 B2 * | 2/2022 | Gu | B60P 7/02 |
| 11,634,017 B2 * | 4/2023 | Facchinello | B60J 7/1607 |
| | | | 296/100.09 |
| 11,685,242 B2 * | 6/2023 | Schmeichel | B60J 7/141 |
| | | | 296/100.07 |
| 11,890,921 B2 * | 2/2024 | Qiu | B60J 7/198 |
| 2016/0096423 A1 * | 4/2016 | Facchinello | B60J 7/106 |
| | | | 292/256 |
| 2019/0084388 A1 * | 3/2019 | Zheng | B60J 7/041 |
| 2020/0376941 A1 * | 12/2020 | Cai | B60J 7/141 |
| 2022/0227211 A1 † | 7/2022 | Dylewski | |

FOREIGN PATENT DOCUMENTS

| | | | |
|---|---|---|---|
| CN | 107284201 A | † | 10/2017 |
| CN | 107696952 B | † | 12/2020 |

* cited by examiner
† cited by third party

*Primary Examiner* — Jason S Daniels

(57) ABSTRACT

A fully-embedded soft four-fold bed cover for a pickup truck, including a large frame and a layer of leather covering the large frame; the large frame includes a front rail frame, a large rotating shaft assembly, a medium rotating shaft assembly, a small rotating shaft assembly and a tail rail frame, the front rail frame is connected to the rear cargo hopper through the front rail fixing clamp, the tail, rail frame is connected to the rear cargo hopper through the locking bolt assembly, the large rotating shaft assembly and the front rail frame, the medium rotating shaft assembly and the large rotating shaft assembly, the small rotating shaft assembly and the medium rotating shaft assembly, the tail rail frame and the small rotating shaft assembly are connected by the side rail.

10 Claims, 13 Drawing Sheets

FULLY-EMBEDDED SOFT FOUR-FOLD BED COVER FOR A PICKUP TRUCK

TECHNICAL FIELD

This invention is relevant to automobile accessories, especially a fully-embedded soft four-fold bed cover for a pickup truck.

BACKGROUND TECHNOLOGY

The rear cargo hopper of the pickup truck (also known as a sedan truck) is often used to carry goods. Since the rear cargo hopper is open, people invented the bed cover to avoid wetting the goods in the rear cargo hopper in rainy and snowy weather. Install the bed cover on the pickup truck's rear cargo hopper and use the cover to prevent the goods in the rear cargo hopper from getting wet by rain.

The current soft four-fold bed cover uses hinges and other structures to install several reversible cover plates on a frame, and the upper surface is covered with a layer of leather. The gap of the present rotating shaft structure on the market is relatively large, and it is easy to clamp the covering leather into the rotating shaft when rotating, damaging the bed cover and causing water leakage for a long time.

ABOUT THE INVENTION

The purpose of the present invention is to provide a fully-embedded soft four-fold bed cover for a pickup truck; by changing the original rotating shaft structure, the problem of leather clamping will not occur during the rotating process of the bed cover.

In order to solve the problems mentioned above, the technical solution adopted in the present invention is as follows:

A fully-embedded soft four-fold bed cover for a pickup truck includes a large frame and a layer of leather covering the large frame, the large frame, includes a front rail frame, a large rotating shaft assembly, a medium rotating shaft assembly, a small rotating shaft assembly and a tail rail frame.

The front rail frame is connected to the rear cargo hopper through a front rail fixing clamp, the tail rail frame is connected to the rear cargo hopper through a locking bolt assembly.

The large rotating shaft assembly and the front rail frame, the medium rotating shaft assembly and the large rotating, shaft assembly, the small rotating shaft assembly and the medium rotating shaft assembly, the tail rail frame and the small rotating shaft assembly are all connected by a side rail.

These side rails and rotating shaft assemblies (large rotating shaft assembly, medium rotating shaft assembly and small rotating shaft assembly) form a horizontal frame, the lateral frame, the front rail frame, and the tail rail frame form a large frame of the four-fold cover, the locking bolt assembly and the front rail fixing clamps form longitudinal support.

Further, the medium rotating shaft assembly includes an intermediate joint and two side joints, the two side joints are respectively rotatably connected to two ends of the intermediate joint in rotation, one end of the intermediate joint is provided with a convex portion, the other end of the intermediate joint is provided with a concave portion, one of the side joints is provided with a rotating concave portion corresponding to the convex portion, the other side joint is provided with a convex portion corresponding to the rotating concave portion, the convex portion and the rotating concave portion are the rotation center of the rotating shaft assembly; one of the rotation centers is set at the intermediate joint, the other rotation, center is set at the side joint, the two, rotation centers are designed asymmetrically; the leather will shift towards one side to avoid stacking, so the leather will not be clamped to prolong the service life of the leather; the end of the convex portion is arc-shaped, both sides of the rotating concave portion are arc-shaped, since the intermediate joint and the side joint will rotate relatively, the two opposite parts are processed into a circular arc in order not to affect the rotation, and no collision during the rotation.

Further, the side joint is rotatably connected to the intermediate joint through a screw assembly; the screw assembly includes a screw, a nut and a sleeve; the screw passes through the convex portion and the rotating concave portion, the screw is sleeved with a sleeve, a nut is connected to the rear end of the screw. Since the traditional screw assembly does not have a sleeve, both the convex portion and the rotating concave portion will rub against the screw when rotating. The screw assembly, as the rotating center, is easy to loosen the screw assembly after long-term use or even, cause the screw to break. By attaching the sleeve on the screw, the friction between the original convex portion, the rotating concave portion and the screw is transformed into the friction between the convex portion, the rotating concave portion and the sleeve, which greatly extends the service, life of the screw.

Further, both one side of the intermediate joint and one side of the side joint are inclined surfaces; the inclined surface is provided with an avoidance portion, and the avoidance portion is arranged correspondingly with the convex portion, the avoiding part is arranged at the side joint when the convex portion is connected to the side joint, when the convex portion is connected to the intermediate joint, the avoiding portion is also connected to the intermediate joint. In order to prevent the side joint and the intermediate joint from interfering during the rotation process, a circular arc surface is set at the top, and a corresponding avoiding part is also set at the inclined surface to avoid, skin clamping during the rotation.

Further, the side joint is provided with a first, and second side rail, buckle for connecting the side, rail; the second side rail buckle is provided with a mounting hole. Since the intermediate beam of the original rotating part is eliminated, the side rail needs to be driven by the side joint to rotate during rotation to ensure the stability of the connection between the side rail and the side joint, the side rail joint can be well engaged with the side rail by the setting of first side rail buckle and the second side rail buckle the second side rail buckle is provided with a mounting hole simultaneously, and screws connect the side rail through the mounting hole, which can ensure the stability of the connection and prevent falling during the rotation process.

Further, one side of the second side rail buckle is provided with a first side rail buckle, and the other side of the second side rail buckle is provided with a stiffener. Since there is no traditional medium beam structure, the manufacturing cost is greatly reduced. In order to drive the bed cover to rotate only through the side joint, stiffeners are added on the side joint to effectively improve the side structure's force strength and prolong the service life of the side joint; all large, medium and small rotating shaft assemblies have the same structure, while the intermediate joint of the large rotating shaft assembly is much longer, and the intermediate joint of the small rotating shaft assembly is much shorter.

Further, the front rail frame is connected to the side rail through a front rail joint, the front rail frame is connected with a front rail rubber strip, the front rail joint is connected with a front rail, joint gasket, the front rail frame is connected with a front rail fixing clamp, both ends of the front rail fixing clamp are connected to the two side rails, the front rail fixing clamp includes a fixed profile, the fixed profile is engaged with a sliding block, the sliding block is connected with a T-shaped screw, the other end of the T-shaped screw is connected with a buckle.

Further, both ends of the fixed profile are connected with fixed clamping plugs; the fixed profile extends into the side rail and connects the side rail and the rear cargo hopper through the T-shaped screw and the buckle. When installing, first, connect one end of the T-shaped screw with the sliding, block, then place the sliding block in the fixed profile, then install the clamp plugs at both ends of the fixed profile, and connect the fixed profile with the side rail, finally sleeve buckle on the T-shaped screw and connect the plum nut at the lower end of the T-shaped, screw to complete the installation of the front rail fixing clamp.

Further, the larger end of the T-shaped screw is engaged in the sliding block and can be rotated in the sliding block; the T-shaped screw is fixed on the sliding block and can slide on the guide rail profile with the sliding block; the buckle is rotatably fixed on the T-shaped screw and fixed the buckle on the side rail of the cargo hopper, a plum nut is arranged under the buckle.

Further, the large frame is connected with a locking bolt assembly, the locking bolt assembly includes a guide rail profile, two ends of the guide rail profile are respectively connected to the side rails on both sides. The guide rail profile is connected with two locking assemblies, steel wires connect the two locking assemblies, the locking assembly includes a locking bolt connected with the guide rail profile, an elastic assembly is connected inside the locking bolt, one end of the elastic assembly is connected with a lock, the other end of the elastic assembly is connected with a locking bolt connecting block, both ends of the steel wire are respectively connected to two locking bolt connecting blocks, the locking bolt assembly is used to lock the bed cover without the front rail fixing clamp, the rear of the car cover needs to be opened frequently, so the switch of the locking bolt assembly should be convenient and easy to operate. By providing a steel wire and an elastic assembly, the steel wire can be pulled to make the two lock contracted simultaneously and separate the frame and the rear cargo hopper to facilitate the opening of the bed cover. After releasing the steel wire, the two locks will automatically reset under the action of the elastic assembly.

Further, each locking assembly is provided with a pulling assembly, the pulling assembly includes a locking bolt base that is fixedly connected with the guide rail profile, a handle leather that is sleeved on the steel wire, the handle leather is connected to a handle. In order to facilitate the user to pull the steel wire, a handle and a handle leather are connected to the steel wire, the two ends of the handle leather are sleeved on the steel wire and the handle, respectively, so that pulling the handle can directly separate steel wire, lock and the limiting section; since the handle leather is sleeved on the steel wire, in order to prevent the handle leather from sliding to the middle of the rear cargo hopper, the locking bolt base is installed on the guide rail profile, and the steel wire passes through the locking bolt base, and the handle leather is placed in the middle of the locking bolt base to stop the handle.

Further, the locking bolt assembly is provided with a clamp lock fixing system correspondingly; the clamp-lock fixing system includes a clamping section connected with the rear cargo hopper and a limiting section for supporting the side rail, the limiting section is used for restrict the lock, by providing the clamp lock fixing system, both to form a support for the side rails in connection with the carriage and to provide a snap-in point for the lock to snap into place.

Further, the tail rail frame is connected to the side rail through a tail rail joint; the tail rail frame is connected with a tail rail rubber strip, and the tail rail joint is connected with a tail rail joint gasket.

The Beneficial Effects of the Present Invention are:

Compared with other rotating shaft structures, the present invention sets one of the rotating centers at the intermediate joint and the other rotation center at the side joint; the two rotation centers are designed asymmetrically; the leather will shift towards one side to avoid stacking, not be clamped the leather to prolong the service life of the leather;

The present invention converts the friction between the original convex portion, the rotating concave portion and the screw into the friction between the convex portion, the rotating concave portion and the sleeve by attaching the sleeve to the screw, which greatly extends the service life of the screw.

The invention is, provided with a steel wire and an elastic assembly. By pulling the steel wire, the two locks can be contracted simultaneously to separate the frame and the rear cargo hopper, which facilitated the opening of the bed cover. After releasing the steel wire, the two locks will automatically reset under the action of the elastic assembly.

In the present invention, by providing a steel wire and an elastic assembly, the steel wire can be pulled to make the two lock contracted simultaneously and separate the frame and the rear cargo hopper to facilitate the opening of the car cover. After releasing the steel wire, the two locks will automatically reset under the action of the elastic assembly.

In the present invention, in order to facilitate the user to pull the steel wire, a handle and a handle leather are connected to the steel wire, and the two ends of the handle leather are sleeved on the steel wire and the handle respectively, so that pulling the handle can directly separate the steel wire, the lock and the limiting section.

In the picture: 1—Leather; 2—Front rail fixing clamp; 201—Buckle; 202—T-shaped screw; 203—Sliding block; 204—Fixing clamp plug; 205—Fixing profile; 3—Front rail frame; 301— Front rail rubber strip; 302—Front rail joint; 303—Front rail joint gasket; 4—Large rotating shaft assembly; 5—Clamp-lock fixing system; 51—Clamping section; 52—Limiting section; 6—Medium rotating shaft assembly; 61—Intermediate joint; 62—Rotating concave portion; 63—Side joint; 631—Second side rail buckle; 632—First side rail buckle; 633—Stiffener; 634—Avoidance portion; 635—Mounting hole; 64—Screw assembly: 641—Sleeve; 642—Nut; 643—Screw; 65—Conex portion; 7—Small rotating shaft assembly; 8—Tail rail frame; 801—Tail rail rubber strip; 802—Tail rail joint 803—Tail rail joint Gasket; 9—Locking bolt assembly; 901—Locking bolt plug; 902—Locking bolt; 903—Locking bolt connection block; 904—Locking bolt base; 905—Handle leather; 906—Handle; 907—Steel wire; 908—Guide rail profile; 909—Lock, 10—Side rail.

The Concrete Method to Carry out

The following instruction further explains the invention's concrete implementation method.

In order to enable a clearer understanding of the objects mentioned above, features and advantages of the present invention, the invention is described in detail below in connection with the accompanying drawings and specific embodiments. It should be noted that the embodiments of the present application and the features in the embodiments can be combined without conflict.

The terms "first", "second", "third", etc. are only used to differentiate the description and should not be construed as indicating or implying relative importance.

In the description of the invention, it should also be noted that, unless otherwise expressly specified and limited, the terms "arranged," "installed," "connected," and "combined" should be understood in a broad sense; for example, it may be a fixing connection, it can also be a detachable connection or an integral connection; it can be a mechanical connection or an electrical connection; it can be a direct connection or an indirect connection through an intermediate media, and it can be internal connection within two components. For those of ordinary skill in this field, specific meanings of the above terms in the present invention can be understood in specific situations.

The specific embodiments of the present invention will be described in detail below in connection with the accompanying drawings. It should be understood that the specific embodiments described herein are intended only to illustrate and explain the present invention and not to limit it.

Embodiment 1

Figure 1:
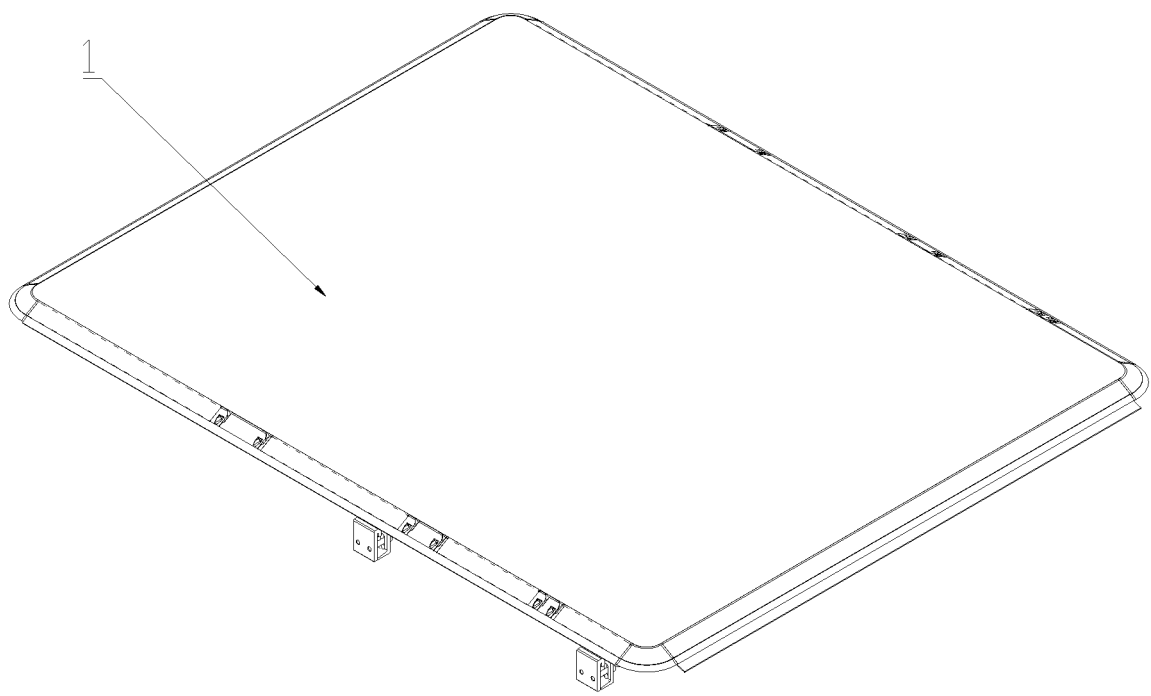
FIG. 1 is the structure schematic diagram of the present invention.
Figure 2:
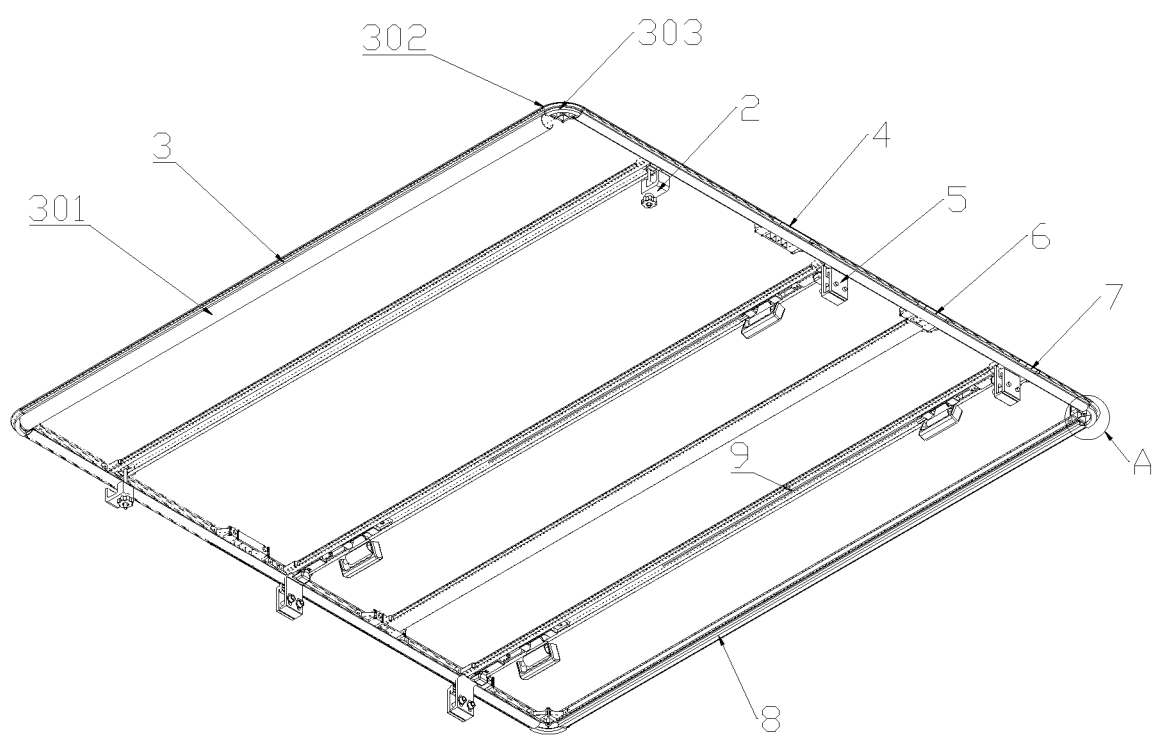
FIG. 2 is the structure schematic diagram of the frame in the present invention.
Figure 3:
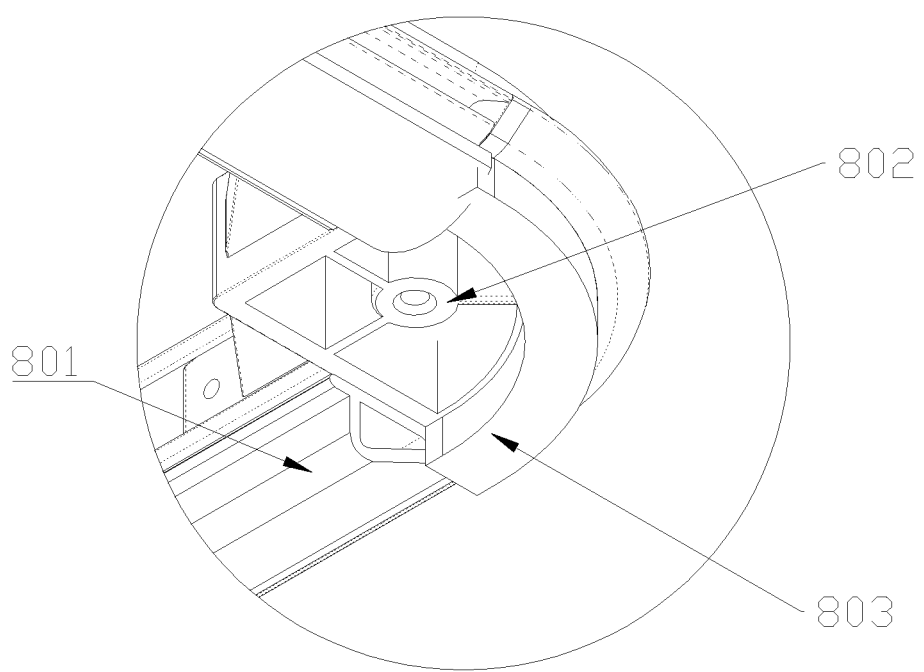
FIG. 3 is a partial enlarged view of part A in FIG. 2.

As shown in FIGS. 1 and 2, a fully-embedded soft four-fold bed cover for a pickup truck includes a large frame and a layer of leather 1 covering the large frame; the large frame includes a front rail frame 3, a large rotating shaft assembly 4, a medium rotating shaft assembly 6, a small rotating shaft assembly 7 and a tail rail frame 8;

The front rail frame 3 is connected to the rear cargo hopper through a front rail fixing clamp 2, the tail rail frame 8 is connected to the rear cargo hopper through a locking bolt assembly 9;

The large rotating shaft assembly 4 and the front rail frame 3, the medium rotating shaft assembly 6 and the large rotating shaft assembly 4, the small rotating shaft assembly 7 and the medium rotating shaft assembly 6, the tailgate frame 8 and the small rotating shaft assembly 7 are all connected by a side rail 10.

These side rails 10 and rotating shaft assemblies (large rotating shaft assembly 4, medium rotating shaft assembly 6 and small rotating shaft assembly 7) forma lateral frame, the lateral frame, the front rail frame 3 and tail rail frame 8 form a large frame of the four-fold cover.

Embodiment 2

On the basis of Embodiment 1, as shown in FIGS. 6-9, the medium rotating shaft assembly 6 includes an intermediate joint 61 and two side joints 63; the two side joints 63 are rotatably connected to two ends of the intermediate joint 61 respectively, and one end of the intermediate joint 61 is provided with a convex portion 65, the other end of the intermediate joint 61 is provided with a rotating concave portion 62, one of the side joints 63 is provided with a rotating concave portion 62 corresponding to the convex portion 65, the other side joint 63 is provided with a rotating convex portion 65 corresponding to the concave portion 62.

The convex portion 65 and the rotating concave portion 62 are the rotation centers of the rotating shaft assembly, one of the rotation centers is set at the intermediate joint 61, and the other is set at the side joint 63. When rotating, the side joint 63 on one side rotates first, which drives the middle joint 61 to rotate, and finally drives the other side joint 63 to rotate. Since the upper side of the large frame needs to be connected to the leather 1; if the two rotation centers are symmetrically arranged, the rotation of the rotating assembly will drive the leather 1 to pull inward or outward at the same time, the leather 1 will be broken after long-term use, which is easy causes water leakage; therefore, the two centers of rotation are designed asymmetrically; when turning, the leather will shift towards one side to avoid stacking, so it does not clamp the leather to prolong its service life of the leather.

The end of the convex portion 65 is arc-shaped, and both sides of the rotating concave portion 62 are arc-shaped, since the intermediate joint 61 and the side joint 63 will rotate relative to each other, the two opposite parts are processed into a circular arc in order not to affect the rotation, and no collision during the rotation.

Embodiment 3

Figure 10:
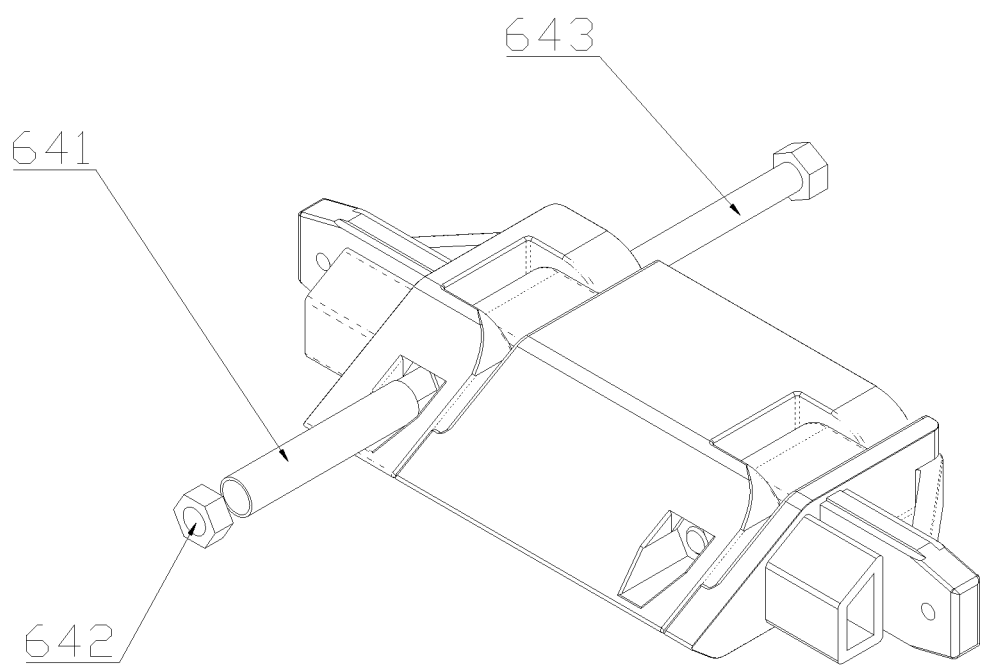
FIG. 10 is an exploded view of the screw assembly in FIG. 7.
Figure 11:
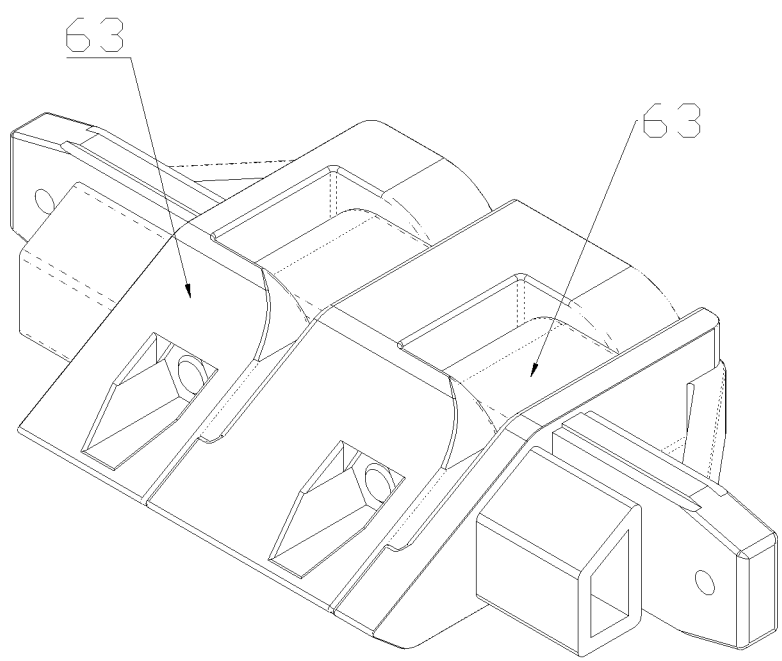
FIG. 11 is a schematic structural diagram of the small rotating shaft assembly in FIG. 2.

On the basis of Embodiment 2, as shown in FIGS. 10 and 11, the side joint 63 is rotatably connected to the intermediate joint 61 through a screw assembly 64, the screw assembly 64 includes a screw 643, a nut 642 and a sleeve 641, the screw 643 passes through the convex portion 65 and the rotating concave portion 62, the screw 643 is sleeved with a sleeve 641, and a nut 642 is connected to the rear end of the screw 643.

Since the traditional screw assembly 64 does not have a sleeve 641, both the convex portion 65 and the rotating concave portion 62 will rub against the screw 643 when rotating. The screw assembly 64, as the rotating center, is easy to loosen the screw assembly after long-term use or even cause the screw to break, by attaching the sleeve 641 on the screw 643, the friction between the original convex portion 65, the rotating concave portion 62 and the screw 643 is transformed into the friction between the convex portion 65, the rotating concave portion 62 and the sleeve 62, which greatly extends the service life of the screw 643.

The sleeve 641 can slide in the hole of the medium rotating shaft assembly 6. Thus, the screw 643 will not be subjected to rotational force during the rotation process and will not always contact, the plastic joint of the rotating shaft. The nut 642 and the screw 643 will not be disengaged due to the increased friction caused by too many rotations.

Both one side of the intermediate joint 61 and one side of the side joint 63 are both inclined surfaces, the inclined surface is provided with an avoidance portion 634, the avoidance portion 634 is correspondingly arranged with the convex portion 65 (due to the asymmetric setting of the rotation center, the avoidance portion 634 is also asymmetrically arranged), when the convex portion 65 is connected to the side joint 63, the avoidance portion 634 is also arranged on the side joint 63, when the convex portion 65 is connected to the intermediate joint 61, the avoidance portion 634 is also connected to the intermediate joint 61.

In order to prevent interference between the side joint 63 and the intermediate joint 61 during rotation, it is necessary not only to provide an arc surface at the top, but also to provide corresponding avoidance portions 634 on the inclined surfaces to avoid the leather 1 being caught during rotation.

The side joint 63 is provided with a first side rail buckle 632 and a second side rail buckle 631 for connecting the side rail 10, the second side rail buckle 631 is provided with a mounting hole 635.

Since the intermediate beam of the original rotating portion is eliminated, the side joint 63 is required to drive the side rail 10 to rotate during rotation, ensuring the connection stability between the side rail 10 and the side joint 63, the side rail joint can be well engaged with the side rail 10 by the setting of first side rail buckle 632 and the second side rail buckle 631, the second side rail buckle 631 is provided with a mounting hole 635 simultaneously, and screws connect the side rail 10 through the mounting hole 635, which can ensure the stability of the connection and prevent falling during the rotation process.

If divided into left and right, when the joint assembly rotates, the right joint drives the intermediate joint 61 and then drives the left joint, or the left joint drives the intermediate joint 61 and then drives the right joint, one of the two convex portions 65 in the assembly is arranged on the intermediate joint 61, and the other on the left or right joint, the advantage of not having a symmetrical setting is that when rotating, one convex portion 65 will pull the leather 1 inward while the other convex, portion 65 will pull the leather 1 outward, so that the leather 1 will not pull inward at the same time as in a symmetrical setting, thus also reduces the probability of the leather 1 being clamped by the rotating shaft.

One side of the second side rail buckle 631 is provided with a first side rail buckle 632, the other side of the second side rail buckle 631 is provided with a stiffener 633.

Since there is no traditional intermediate beam structure (across the left and right sides of the hood), the manufacturing cost is greatly reduced. In order to drive the bed cover to rotate only through the side joint 63, stiffeners 633 are added on the side joint 63 to effectively improve the side structure's force strength and prolong the service life of the side joint 63.

The large rotating shaft assembly 4, the medium rotating shaft assembly 6 and the small rotating shaft assembly 7 have the same structure, while the intermediate joint 61 of the large rotating shaft assembly 4 is longer, and the intermediate joint 61 of the small rotating shaft assembly 7 is much shorter.

Embodiment 4

Figure 12:
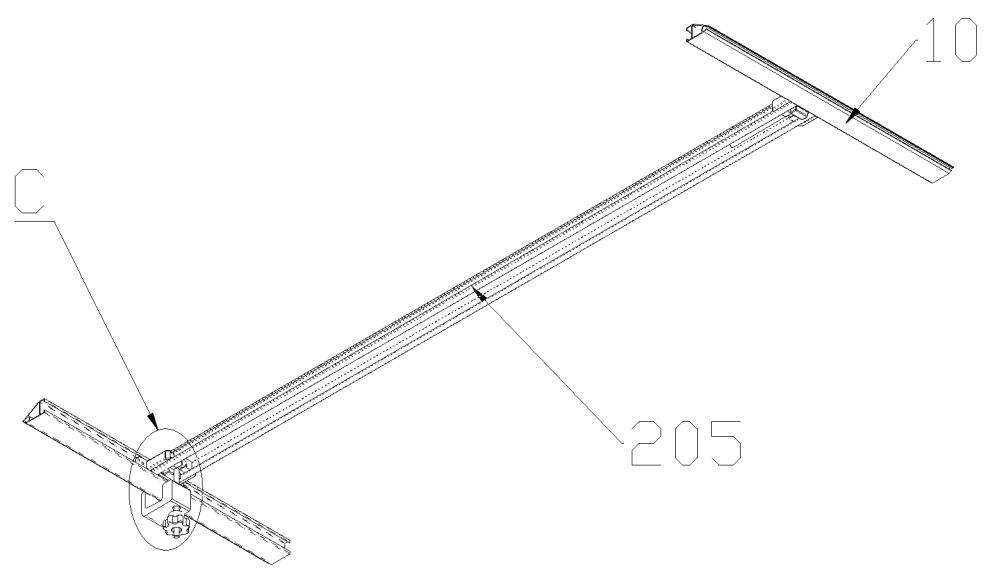
FIG. 12 is the connection schematic diagram of the front rail fixing clamp in FIG. 2.
Figure 13:
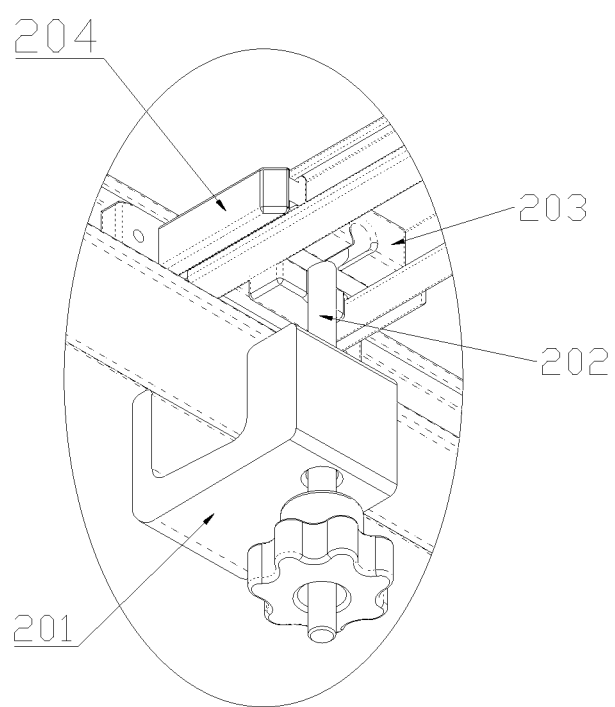
FIG. 13 is a partial enlarged view of part C in FIG. 12.

On the basis of Embodiment 3, as shown in FIGS. 12 and 13, the front rail frame 3 is connected to the side rail 10 through a front rail joint 302, the front rail frame 3 is connected with a front rail rubber strip 301 and a front rail joint 302, the front rail joint is connected with a front rail joint gasket 303.

The front rail frame 3 is connected with a front rail fixing clamp 2, both ends of the front rail fixing clamp 2 are connected to the two side rails 10, the front rail fixing clamp 2 includes a fixed profile 205, the fixed profile 205 is engaged with a sliding block 203, the sliding block 203 is connected with a T-shaped screw 202, the other end of the T-shaped screw 202 is connected with a buckle 201.

Both ends of the fixed profile 205 are connected with fixed clamping plugs 204.

The fixed profile 205 extends into the side rail 10, the fixed profile 205 connects the side rail 10 with the rear cargo hopper through the T-shaped screw 202 and the buckle 201. When installing, first connect one end of the T-shaped screw 202 with the sliding block 203, place the sliding block 203 in the fixed profile 205, then install the fixed clamping, plugs 204 at both ends of the fixed profile 205, connect the fixed profile 205 with the side rail 10, finally, sleeve the T-shaped screw 202 with the buckle 201, and connect the plum nut at the lower end of the T-shaped screw 202 to complete the installation of the front rail fixing clamp 2.

The larger end of the T-shaped screw 202 is engaged in the sliding block 203 and can be rotated in the sliding block 203.

Normally, the front rail frame 3 does not need to be opened, so the front rail fixing clamp 2 does not need to be opened frequently, it only needs to ensure its stable connection. When it, needs to be opened, remove the plum nut 642 and the buckle 201.

The T-shaped screw 202 is fixed on the sliding block 203 and can slide on the guide rail profile 908 with the sliding block 203; the buckle 201 is rotatably fixed on the T-shaped screw 202, the buckle 201 can be fixed, on the side rail 10 of the cargo hopper, the plum nut 642 is arranged under the buckle 201.

When fixing the bed cover, the plum nut 642 rotates on the T-shaped screw 202, and after holding the clamp 201, the aluminium clamp 201 and the side rail 10 of the cargo hopper are fixed, so that the soft four-fold bed cover is fixed on the cargo hopper.

Embodiment 5

Figure 4:
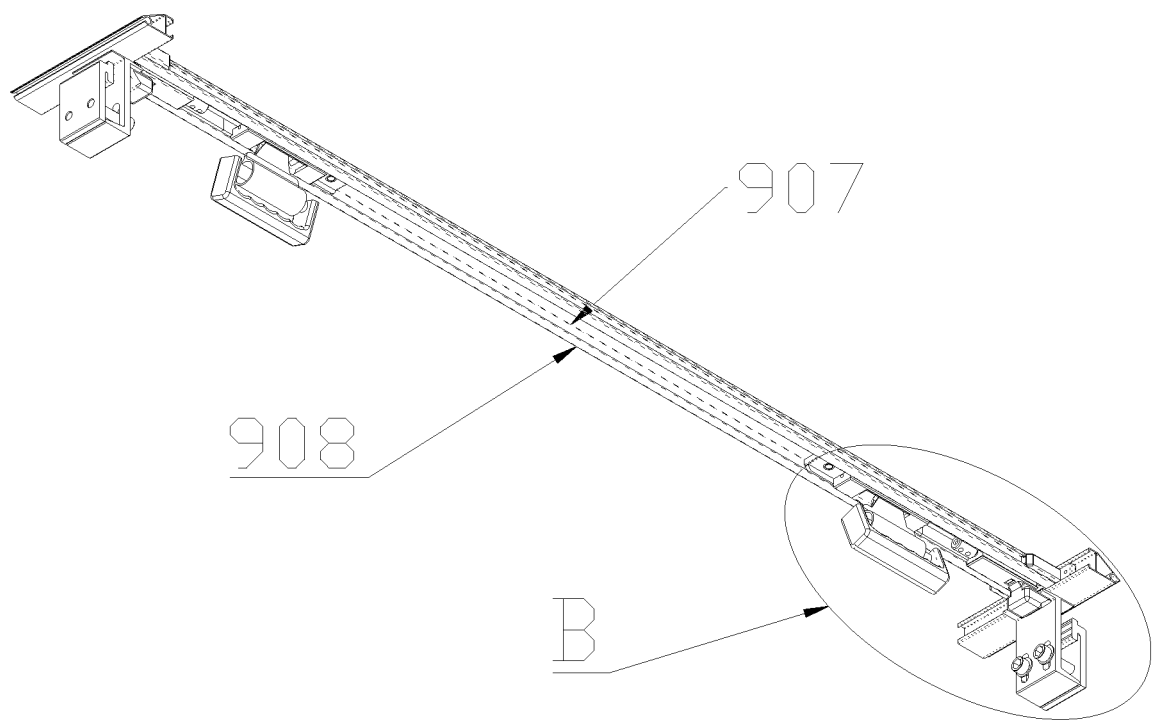
FIG. 4 is the structure schematic diagram of the lock bolt assembly in FIG. 2.
Figure 5:
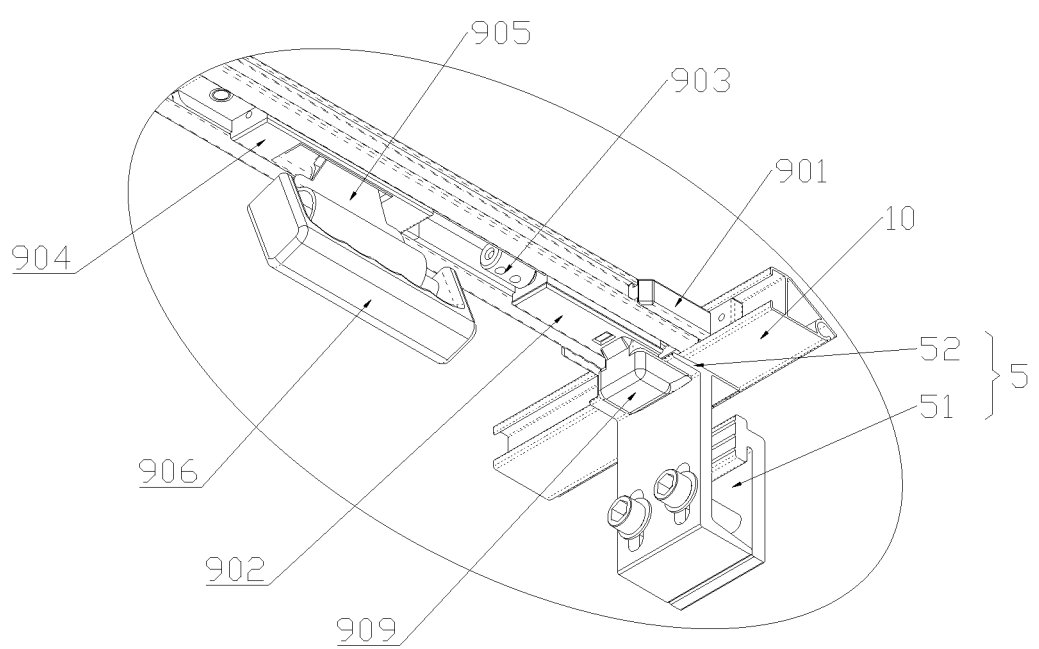
FIG. 5 is a partial enlarged view of part B in FIG. 4.
Figure 6:
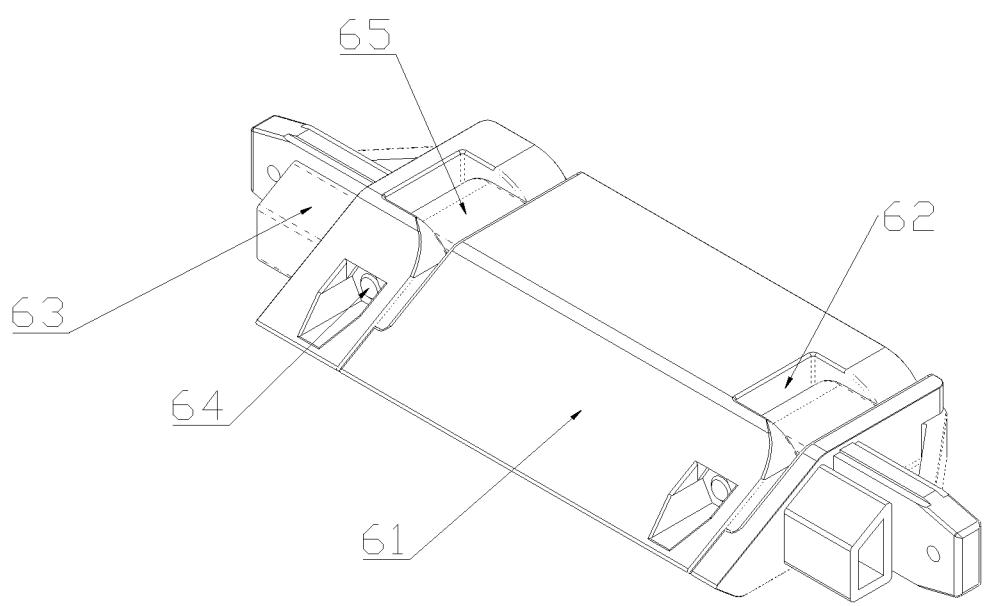
FIG. 6 is structure schematic diagram 1 of the medium rotating shaft assembly in FIG. 2.
Figure 7:
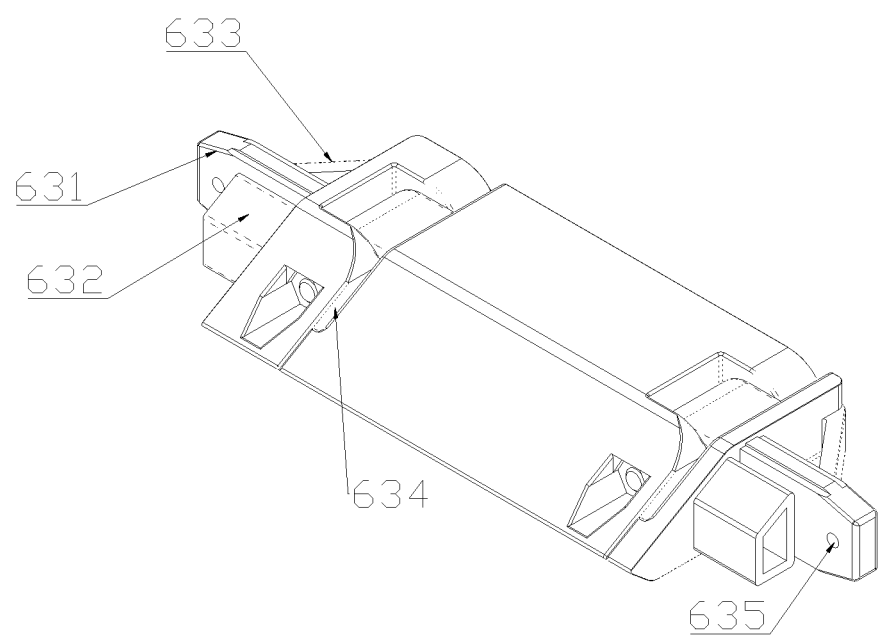
FIG. 7 is structural schematic diagram 2 of the medium rotating shaft assembly in FIG. 2.
Figure 8:
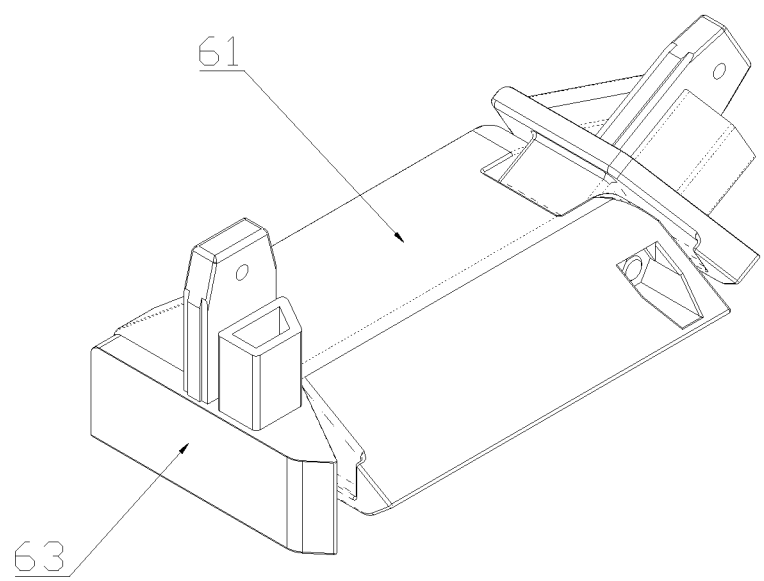
FIG. 8 is structural schematic diagram 3 of the medium rotating shaft assembly in FIG. 2.
Figure 9:
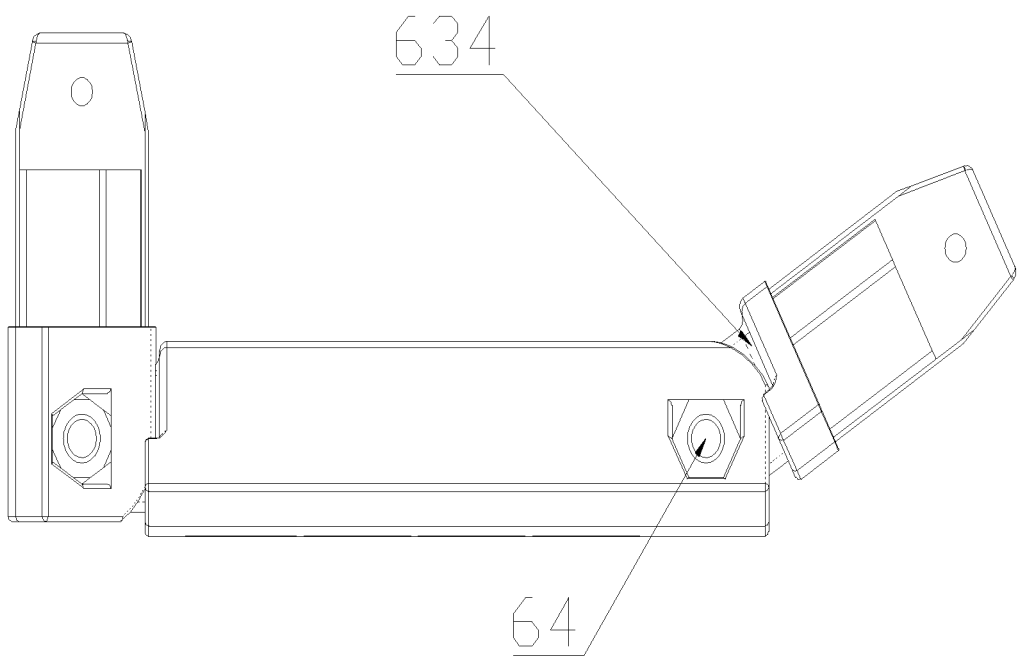
FIG. 9 is structural schematic diagram 4 of the medium rotating shaft assembly in FIG. 2.

On the basis of Embodiment 4, as shown in FIGS. 4 and 5, the large frame is connected with a locking bolt assembly 9, the locking bolt assembly 9 includes a guide rail profile 908, two ends of the guide rail profile 908 are respectively connected with locking bolt plug 901, two ends of the guide rail profile 908 are connected to the side rails 10 on both sides, the guide rail profile 908 is connected with two locking assemblies, the two locking assemblies are connected by a steel wire 907, the locking assembly includes a the locking bolt 902 which connected with the guide rail profile 908, an elastic assembly (the elastic assembly is in the prior art, mainly realized by a spring, which is directly transferred here) is connected inside the locking bolt 902, one end of the elastic assembly is connected with a lock 909, the other end, of the elastic assembly is connected with a locking bolt connecting block 903, both ends of the steel wire 907 are respectively connected with two locking bolt connecting blocks 903.

The locking bolt assembly 9 is used for locking the bed cover, without the front rail fixing clamp 2, the rear part of the bed cover needs to be opened frequently, so the switch of the locking bolt assembly 9 should be convenient and easy to operate. By providing a steel wire 907 and an elastic assembly, the steel wire 907 can be pulled to make the two locks 909 contracted simultaneously and separate the frame and the rear cargo hopper to facilitate the opening of the bed cover. After releasing the steel wire, the two locks 909 will automatically reset under the action of the elastic assembly.

Each locking assembly is correspondingly provided with a pulling assembly, the pulling assembly includes a lock bolt base 904 that is fixedly connected with the guide rail profile 908, a handle leather 905 sleeved on the steel wire 907, the handle leather 905 is connected with a handle 906.

In order to facilitate the user to pull the steel wire 907, the handle 906 and the handle leather 905 are connected to the steel wire 907, the two ends of the handle leather 905 are sleeved on the steel wire 907 and the handle 906 respectively, so that pulling the handle 906 can directly separate the steel wire 907, the lock 909 and the limiting section 52.

Since the handle leather 905 is sleeved on the steel wire 907, in order to prevent the handle leather 905 from sliding to the middle of the rear cargo hopper, the locking bolt base 904 is installed on the guide rail profile 908, the steel wire 907 passes through the locking bolt base 904, and the handle leather 905 is placed in the middle of the lock bolt base to stop the handle 906.

The lock bolt assembly 9 is provided with a clamp-lock fixing system 5 correspondingly, the clamp-lock fixing system 5 includes a clamping section 51 connected with the rear cargo hopper and a limiting section 52 for supporting the side rail 10, the limiting section 52 is used for restrict the lock 909.

By providing the clamp-lock fixing, system 5, both to form a support for the side rail 10 in connection with the carriage and to provide a snap-in point for the lock 909 to snap into place.

Embodiment 6

On the basis of Embodiment 2, the tail rail frame 8 is connected to the side rail 10 through a tail rail joint 802, the tail rail frame 8 is connected with a tail rail rubber strip 801, the tail rail joint 802 is connected with a tail rail joint gasket 803.

The present invention is not limited to the above-mentioned optional embodiment, anyone can produce various other forms under the inspiration of the present invention. However, regardless of changes in its shape or structure, all technical solutions that fall within the scope defined by the claims of the present invention fall within the scope of protection of the present invention.

What is claimed is:

1. A fully-embedded soft four-fold bed cover for a pickup truck, includes a large frame and a layer of leather (1) covering the large frame, the large frame includes a front rail frame (3), a large rotating shaft assembly (4), a medium rotating shaft assembly (6), a small rotating shaft assembly (7) and a tail rail frame (8);

the large rotating shaft assembly (4) and the front rail frame (3), the medium rotating shaft assembly (6) and the large rotating shaft assembly (4), the small rotating shaft assembly (7) and the medium rotating shaft assembly (6), the tail rail frame (8) and the small rotating shaft assembly (7) are all connected by a side rail (10);

the medium rotating shaft assembly (6) includes an intermediate joint (61) having two ends and two side joints (63), the two side joints (63) are rotatably connected to the two ends of the intermediate joint (61) respectively, one end of the two ends of the intermediate joint (61) is provided with a convex portion (65), the other end of the two ends of the intermediate joint (61) is provided with a rotating concave portion (62), one of the side joints (63) is provided with the rotating concave portion (62) corresponding to the convex portion (65), the other side joint (63) is provided with the convex portion (65) corresponding to the rotating concave portion (62), an end of the convex portion (65) is arc-shaped, both sides of the rotating concave portion (62) are circular arcs, one side of the intermediate joint (61) and one side of the side joint (63) are inclined surfaces, the inclined surfaces are provided with an avoidance portion (634), the avoidance portion (634) is arranged corresponding with the convex portion (65).

2. The fully-embedded soft four-fold bed cover according to claim 1, wherein the side joint (63) is rotatably connected to the intermediate joint (61) through a screw assembly (64), the screw assembly (64) includes a screw (643), a nut (642) and a sleeve (641), the screw (643) passes through the convex portion (65) and the rotating concave portion (62), the screw (643) is sleeved with the sleeve (641), the nut (642) is connected to a rear end of the screw (643).

3. The fully-embedded soft four-fold bed cover according to claim 1, wherein the side joint (63) is provided with a first side rail buckle (632) and a second side rail buckle (631) for connecting the side rail (10), the second side rail buckle (631) is provided with a mounting hole (635), one side of the second side rail buckle (631) is provided with the first side rail buckle (632), and the other side of the second side rail buckle (631) is provided with a stiffener (633).

4. The fully-embedded soft four-fold bed cover according to claim 1, wherein the front rail frame (3) is connected to the side rail (10) through a front rail joint (302), the front rail frame (3) is connected with a front rail rubber strip (301), the front rail joint (302) is connected with a front rail joint gasket (303), the front rail frame (3) is connected with a front rail fixing clamp (2) having two ends, the two ends of the front rail fixing clamp (2) are connected to two side rails (10) respectively, the front rail fixing clamp (2) includes a fixed profile (205), both ends of the fixed profile (205) are connected with fixing clamp plugs (204), the fixed profile (205) is engaged with a sliding block (203), the sliding block (203) is connected to one end of a T-shaped screw (202), the other end of the T-shaped screw (202) is connected with a buckle (201).

5. The fully-embedded soft four-fold bed cover according to claim 4, wherein the one end of the T-shaped screw (202) is engaged in the sliding block (203) and can slide in the sliding block (203).

6. The fully-embedded soft four-fold bed cover according to claim 1, wherein the large frame is connected with a locking bolt assembly (9), the locking bolt assembly (9) includes a guide rail profile (908) having two ends, the two ends of the guide rail profile (908) are respectively connected to the side rails (10) on both sides, the guide rail profile (908) is connected with two locking assemblies, the two locking assemblies are connected by a steel wire (907), the locking assembly includes a locking bolt (902) connected to the guide rail profile (908), an elastic assembly is connected inside the locking bolt (902), one end of the elastic assembly is connected with a lock (909), the other end of the elastic assembly is connected with a locking bolt connecting block (903), both ends of the steel wire (907) are respectively connected to two locking bolt connecting blocks (903).

7. The fully-embedded soft four-fold bed cover according to claim 6, wherein each locking assembly is correspondingly provided with a pulling assembly, the pulling assembly includes a lock bolt base (904) that is fixedly connected with the guide rail profile (908), and a handle leather (905) that is sleeved on the steel wire (907), the handle leather (905) is connected with a handle (906).

8. The fully-embedded soft four-fold bed cover according to claim 6, wherein the lock bolt assembly (9) is correspondingly provided with a clamp-lock fixing system (5), the clamp-lock fixing system (5) includes a clamping section (51) that connected with a rear cargo hopper and a limiting section (52) for supporting the side rail (10), the limiting section (52) is used for restrict the lock (909).

9. The fully-embedded soft four-fold bed cover according to claim 1, wherein the tail rail frame (8) is connected to the side rail (10) through a tail rail joint (802), the tail rail frame (8) is connected with a tail rail rubber strip (801), the tail rail joint (802) is connected with a tail rail joint gasket (803).

10. A fully-embedded soft four-fold bed cover for a pickup truck, includes a large frame and a layer of leather (1) covering the large frame, the large frame includes a front rail frame (3), a large rotating shaft assembly (4), and a medium rotating shaft assembly (6);

the large rotating shaft assembly (4) and the front rail frame (3), the medium rotating shaft assembly (6) and the large rotating shaft assembly (4), are both connected by a side rail (10);

the medium rotating shaft assembly (6) includes an intermediate joint (61) having two ends and two side joints (63), the two side joints (63) are rotatably connected to the two ends of the intermediate joint (61) respectively, one end of the two ends of the intermediate joint (61) is provided with a convex portion (65), the other end of the two ends of the intermediate joint (61) is provided with a rotating concave portion (62), one of the side joints (63) is provided with the rotating concave portion (62) corresponding to the convex portion (65), the other side joint (63) is provided with the convex portion (65) corresponding to the rotating concave portion (62), an end of the convex portion (65) is arc-shaped, both sides of the rotating concave portion (62) are circular arcs, one side of the intermediate joint (61) and one side of the side joint (63) are inclined surfaces, the inclined surfaces are provided with an avoidance portion (634), the avoidance portion (634) is arranged corresponding with the convex portion (65).

\* \* \* \* \*